United States Patent [19]

Kirby

[11] Patent Number: 5,370,328
[45] Date of Patent: Dec. 6, 1994

[54] CONVERTIBLE FRONT SHIELD ASSEMBLY FOR SPIN-CAST REELS

[76] Inventor: Thomas G. Kirby, 304 W. Key West, Broken Arrow, Okla. 74011

[21] Appl. No.: 993,819

[22] Filed: Dec. 14, 1992

Related U.S. Application Data

[63] Continuation-in-part of Ser. No. 810,432, Dec. 18, 1991, abandoned, which is a continuation-in-part of Ser. No. 579,570, Sep. 10, 1990, abandoned.

[51] Int. Cl.5 .............................................. A01K 89/01
[52] U.S. Cl. ..................................... 242/238; 242/311
[58] Field of Search ............................. 242/234–240, 242/311, 314, 315, 319; 43/24, 25

[56] References Cited

U.S. PATENT DOCUMENTS

| | | | |
|---|---|---|---|
| 2,650,448 | 9/1953 | Lichtig | 43/25 |
| 3,038,682 | 6/1962 | Yeada | 242/84.2 |
| 3,044,730 | 7/1962 | Yeada | 242/311 |
| 3,105,651 | 10/1963 | Dell Hull | 242/311 |
| 3,166,267 | 1/1965 | Rowe | 242/311 X |
| 3,223,346 | 12/1965 | Fowler | 242/84.2 |
| 3,329,372 | 7/1967 | Willis et al. | 242/84.2 |
| 3,473,753 | 10/1969 | Hull | 242/311 |
| 3,545,119 | 12/1970 | Murnan | 43/25 |
| 3,554,459 | 1/1971 | Matsuo | 242/84.21 |
| 3,581,428 | 6/1971 | Melder | 43/25 |
| 3,797,157 | 3/1974 | Semich | 43/25 X |
| 3,858,822 | 1/1975 | Wood | 242/311 X |
| 3,927,488 | 12/1975 | Peddy | 43/25 |
| 4,130,251 | 12/1978 | Findley | 242/311 X |
| 4,175,716 | 11/1979 | Reichow | 242/234 |
| 4,195,015 | 3/1979 | Noda | 242/311 X |
| 4,331,303 | 5/1982 | Noss | 242/311 |
| 4,448,367 | 5/1984 | Parvean | 242/84.2 A |
| 4,702,031 | 10/1987 | Sousa | 43/24 X |
| 4,768,731 | 9/1988 | Neufeld | 242/239 |
| 4,961,547 | 10/1990 | Peterson et al. | 242/311 X |

OTHER PUBLICATIONS

Zebco 600 and New Zebco 312, Cast Type Spinning Reels Catalog, 1973.

*Primary Examiner*—Katherine Matecki

[57] ABSTRACT

A fishing reel of the spin-cast type, having a body supporting a line-carrying spool, a line wind/release rotor and mounting foot for attachment to a fishing rod. An accessorial convertible front-shield having a part A and a part B which allows the rapid and convenient change of the casting characteristics of a reel, without alteration of the reel mechanism; without the requirement to un-thread and re-thread the fishing line on the rod; and without cutting or otherwise parting the line or removing the lure.

4 Claims, 3 Drawing Sheets

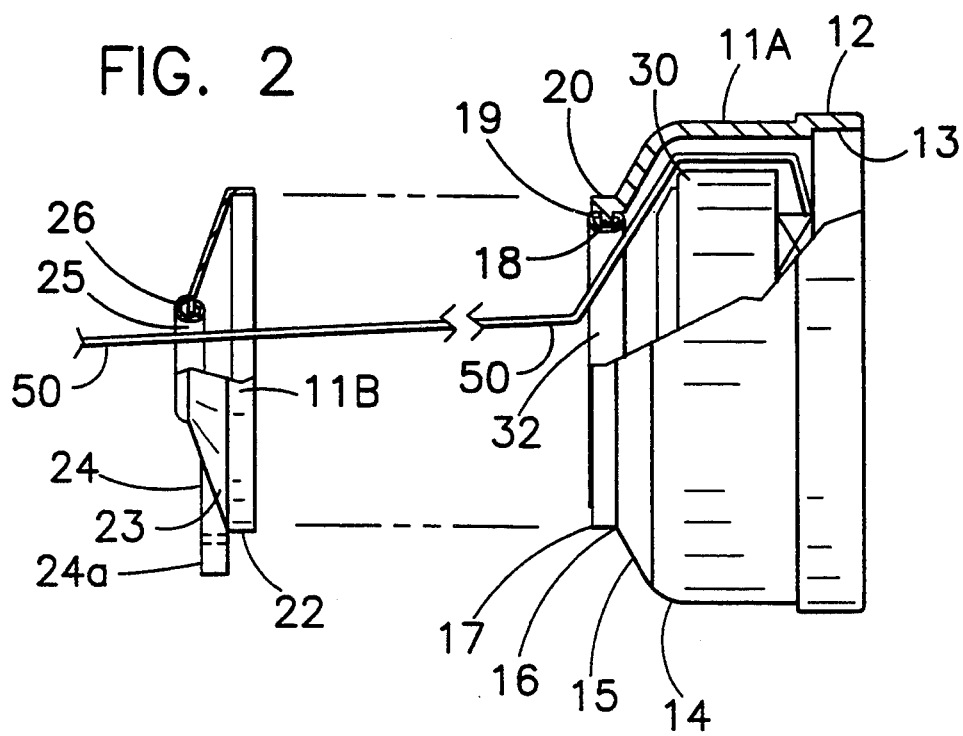
FIG. 1
FIG. 2
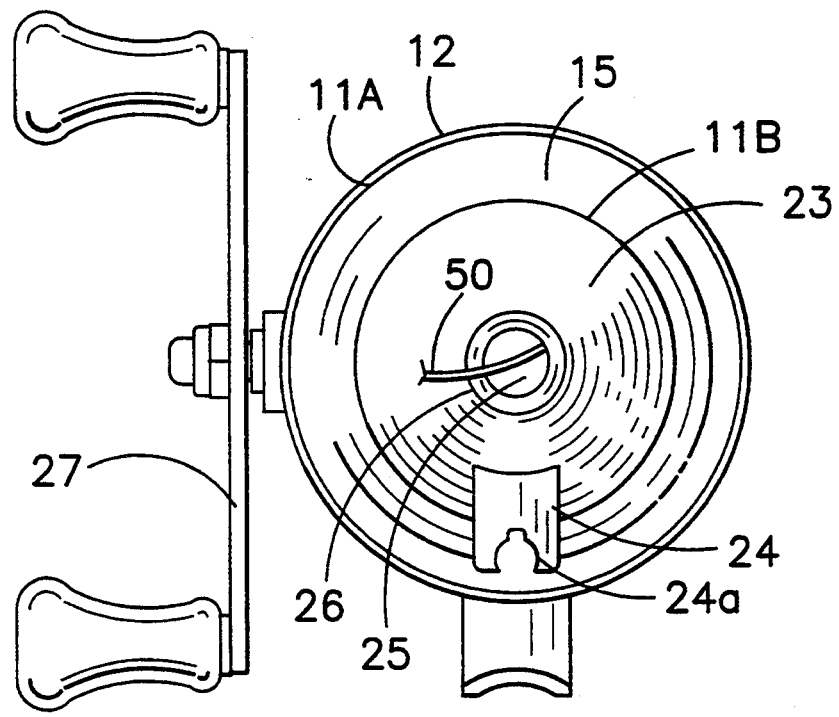
FIG. 3

CONVERTIBLE FRONT SHIELD ASSEMBLY FOR SPIN-CAST REELS

The invention herein disclosed relates to a novel and unique method of controlling and altering the casting characteristics of spin-cast fishing reels and is a continuation-in-part of an application bearing Ser. No. 07/810,432 filed Dec. 18, 1991 under the title FISHING REEL WITH FRONT SHIELD CASTING GUARDS, now abandoned, which is a continuation-in-part of Ser. No. 07/579,570, filed Sep. 10, 1990, now abandoned.

BACKGROUND OF THE INVENTION

The present invention related to a modifying device for application to spin-cast fishing reels of past and current technology and more particularly to a front shield assembly adapted to provide means to conveniently vary, alter or change the casting characteristics of reels of current and future manufacture. It is adjunctive to, supportive of, and represents a significant improvement in spin-cast technology.

Reels of the spin-cast variety, of past and current technology, employ a front cover or shield having a fixed forward opening, of a specific dimension, on their forward end and are suited for only a single size of line and a specific lure weight. The casting characteristics of each reel are established by the dimension and configuration of this fixed, forward opening which imparts, or causes to be imparted, a pre-determined frictional drag upon the cast line.

Historically, many devices and methods have been developed to enhance casting efficiency and reduce the centrifugally induced friction which occurs against the inner surface of the front-shield member as the outflowing line is "wound-off" the spool in reaction to the outward projection of the weighted lure. The front-shield of a fishing reel has traditionally been employed to cause the line to exit the reel at a point proximate the central longitudinal axis of the reel spool and to prevent excessive centrifugally induced "ballooning" of the line as it is wound-off the spool. The configuration, angle of closure, length and the dimensioning of the forward opening of the front-shield are the principal determinants in establishing the casting characteristics of any given reel. Once endowed upon a reel, these characteristics are unalterable and remain essentially constant throughout the useful life of the reel.

Many different means have been disclosed in the prior art to reduce, enhance, or otherwise control friction on the out-flowing line. These are exemplified in part in the disclosures of Yeager in U.S. Pat. Nos. 3,083,682 and 3,044,730; Fowler in U.S. Pat. No. 3,223,346; Willis in U.S. Pat. No. 3,329,372; Matsui in U.S. Pat. No. 3,554,459 and Puryear in U.S. Pat. No. 4,448,367.

Other methods which have been employed to reduce this friction are illustrated in publications, such as FISHING TACKLE TRADE NEWS, April 1990, wherein is featured a "2-piece housing system" which is expressly intended to reduce line friction and enhance the aesthetic presentation; and the TULSA (OKLAHOMA) TRIBUNE OF Jul. 26, 1990, wherein the "Zebco .357 Bullet" designed to increase casting distance, ergo reduce friction, is illustrated.

While it is apparent that each of these examples of the prior art possess merit and while each of these inventors contributed to the wealth of the literature relating to the art, none have addressed the problem that the present invention is expressly intended to solve. This applicant regrets that he is unable to provide examples of prior art which relate more directly to the subject matter of the present invention; however, a diligent search of the art has failed to reveal any examples of the technology herein disclosed.

SUMMARY OF THE INVENTION

The present invention relates to a convertible front shield assembly applicable to spin-cast style fishing reels, of various manufacture, which makes possible the employment of different line sizes and varying lure weights and provides the capability of conveniently changing the casting characteristics of the reel upon which it is used. This capability is achieved by the simple expedient of providing a first part (A) front-shield and second part (B) converting member which may be used alone, or in conjunction with, a variety of disparate converting members, supportable by said first part (A) shield; which includes means for the convenient and rapid substitution of one of these converting members; and a means of retention of one of these converting members upon the casting rod in such a manner that it is conveniently positionable from a place of use upon the reel, to a place of storage upon the rod; and obviates the requirement to remove the lure, remove the line from the rod-mounted line guides or part or cut the line in order to change the forward opening and thus alter the casting characteristics of the reel.

The convertible front-shield assembly may be configured to include the various means of attachment and line stopping or "snubbing" action employed by different manufacturers, who provide reels having only a single set of casting characteristics, in order that the advantages offered by its use may be extended to the owners of all popular model reels. The convertible shield assembly may be incorporated into the construction of reels at the time of their initial fabrication, thus providing the purchaser thereof with the functional equivalency and versatility of two or more reels in a single reel mechanism.

BRIEF DESCRIPTION OF THE DRAWINGS

FIG. 1 is a partially cut-away side elevational view of the convertible first part (A) front-shield as it would appear in the first operational characteristic.

FIG. 2 is a partially cut-away side elevational view of the second part (B) converting member option to the first part (A) front-shield set apart from its position of use.

FIG. 3 is a forward end view of the convertible first part (A) front-shield and second part (B) converting member as it would appear when installed upon a typical spin-cast reel.

PREFERRED EMBODIMENT OF THE INVENTION

Figure 4:
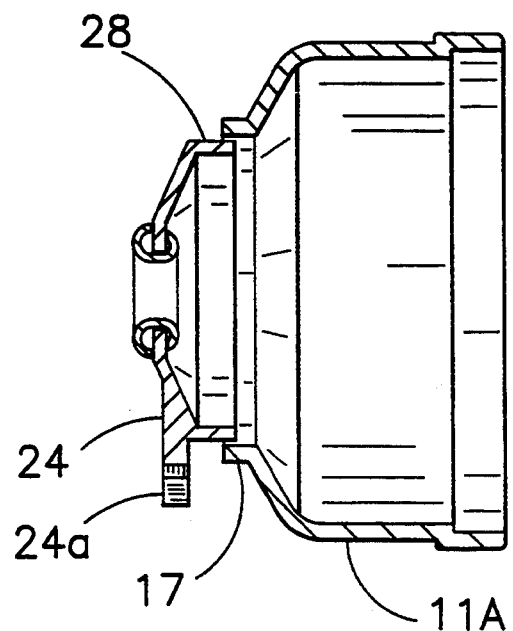
FIG. 4 is a diametric cut-away, side elevational view of the convertible first part (A) front-shield and second part (B) converting member, illustrating an alternative method of joining of the two components of the assembly.

Referring to the drawing figures, there is shown a reel, including a body 10, having a closed rearward end and an open forward end, a mounting foot 29 for attachment to a fishing rod. A line carrying spool 31 is mounted on the forward end of the body 10, a center shaft 33 extends axially through the housing 10 with a wind/release rotor 30 secured to the forward end of the center shaft 33, a line retrieval crank 27 is used to rotate wind/release rotor 30 by means of a gearing mechanism (not shown). Rotating said wind/release rotor 30 engages line 50 for winding onto the spool 31; said wind-/release rotor 30 axially advanced by depression of thumb stop 34 causes line 50 snubbing against front shield means 11A. Release of thumb stop 34 allows line 50 to be cast out over said wind/release rotor.

Elements described to this point are conventional to prior art spin-cast fishing reels.

In the first instance, it should be recognized that the present invention is a convertible front-shield assembly having a first part (A) front-shield and a second part (B) converting member for spin-cast fishing reels which is accessorial in nature and is applicable and adjunctive to such reels of the past, current and future production of a wide number of manufacturers. It should be further recognized that said invention is comprised of only two parts, which parts may be employed singularly or in combination, in conjunction with a wide variety of spin-cast reels to effect marked changes in the casting characteristics of said reels.

Fishing reel technology has evolved from the open-face spool to the current state-of-the-art enclosed body casting reel in response to the fisherman's demand for better control of the cast line. The response to this demand has resulted in a proliferation of designs which make possible the accurate placement of the lure in the water, but severely restrict this accuracy to a limited operational envelope. These designs, however, exact a penalty which is directly attributable to their design and construction; that penalty being that each reel is specifically suited to only one particular line size and one particular lure weight, thus creating the requirement for a different reel for each different casting situation.

Referring to the Figures of the Drawings, it will be readily seen that the present invention offers a simple solution to the aforementioned problems through the provision of a convertible front-shield assembly, the base portion of which is depicted in FIG. 1 wherein: a first part (A) front-shield designated 11A, of a hollow thin-wall cylindrical configuration, of a durable plastic, metallic or other suitable construction; which comprises at one end thereof a short longitudinal section 12 of a slightly increased diameter 13. Said section of increased diameter 13 is so configured to permit the adaptation of the convertible first part (A) front-shield for attachable and detachable mounting of said shield to the reel body of various manufacturers by the inter-positioning therebetween of attachment means corresponding to and engageable with the means employed by these manufacturers for the attachment of non-convertible front-shield members. Said attachment means vary widely between manufacturers and may include screw-threads, dent-locks, twist-locks or any of the other conventional means employed for that purpose. Due to the common knowledge of these means of attachment and the universality of their use, they are not herein illustrated. The distal or opposing end of said cylindrical first part (A) front-shield member 11A translates, by way of a suitable radius 14, to a short angular inwardly disposed section 15 having the form of a short truncated cone. The conical or inwardly disposed section 15 abruptly terminates at the truncation 16 and again translates to a short longitudinal cylindrical portion of a lesser diameter 17 which may have about the inner periphery thereof, an inwardly extending flange-like portion 18 situate proximate the mid-point of the length of said cylindrical portion 17. A wear-inhibiting ring 19 of a durable metallic construction adapted to engage the inner periphery of the cylindrical portion of lesser diameter 17 and to pass over the flange-like portion 18 may be positioned within the inner circumference and fixedly secured in gripping engagement with an internal flange-like portion 18 by rolling, compression, flaring or other suitable means. The short cylindrical section 20 extending outwardly from the truncation of conical portion 15 of the first part (A) front-shield member 11A serves as a mounting location for the second or converting element of the device.

The second part (B) converting element, is generally designated in FIG. 2 as 11B. Said member 11B is provided with a short cylindrical section 22 which is internally adapted for removable attachment with the outer periphery of the short cylindrical portion 17 of first part (A) front-shield member 11A by means of corresponding screw-threads, dent-locks, twist-locks or other suitable means interposed therebetween, which for the reasons hereinabove stated are not illustrated. The body of the second part (B) converting element 11B extends radially inward from the short cylindrical section 22 and assumes a conical cross-section 23 similar to that of conical section 15 of a like or greater included angularity. Said second part (B) converting element 11B may include in its construction a short radially extending leg-like portion 24, formed integrally therewith, which includes in its construction a conventional spreadable clip-like portion 24A for the attachment and stowage of the second part (B) converting element 11B on a casting rod in a forwardly displaced position when said element is not in use. Said second part (B) converting element 11B continues angularly inward to a point at which said conical form is truncated prior to achievement of the conical vertex, to provide a forward opening 25 in the forwardly extending face, through which the casting line 50 may pass. A wear-inhibiting ring 26, of a durable metallic construction, similar to that employed in FIG. 1 at location 19, but of a smaller diametric dimension, may be adapted for fixed attachment to the inner periphery of said forward opening 25 by rolling, flaring, compression or by any other well known and commonly employed method of attachment.

FIG. 3 illustrates to advantage the placement of the parts and the manner in which they appear when installed upon a conventional spin-cast reel wherein: the cylindrical first part (A) front-shield 11A has an enlarged diameter portion 12 at the distal end thereof, a front face of a conical configuration 15 in removable attachment with a forwardly extending second part (B) converting element 11B also having a conical configuration 23 and a downwardly extending leg-like member 24 having a conventional spreadable clip-like portion, a central forward opening 25, a metallic wear-guard 26 and the exiting casting line 50.

In FIG. 4, a diametric sectionalized view shows an alternate method of attachment of a forward facing conically configured second part (B) converting element 28, which is substantially identical to second part (B) converting element 11B, with the singular exception of the manner in which it attaches to first part (A) front-shield member 11A. In this embodiment said element enters into, rather than over, the short cylindrical section 17 of said first part (A) member 11A where it is removably attached by means previously described interposed therebetween.

Figure 5:
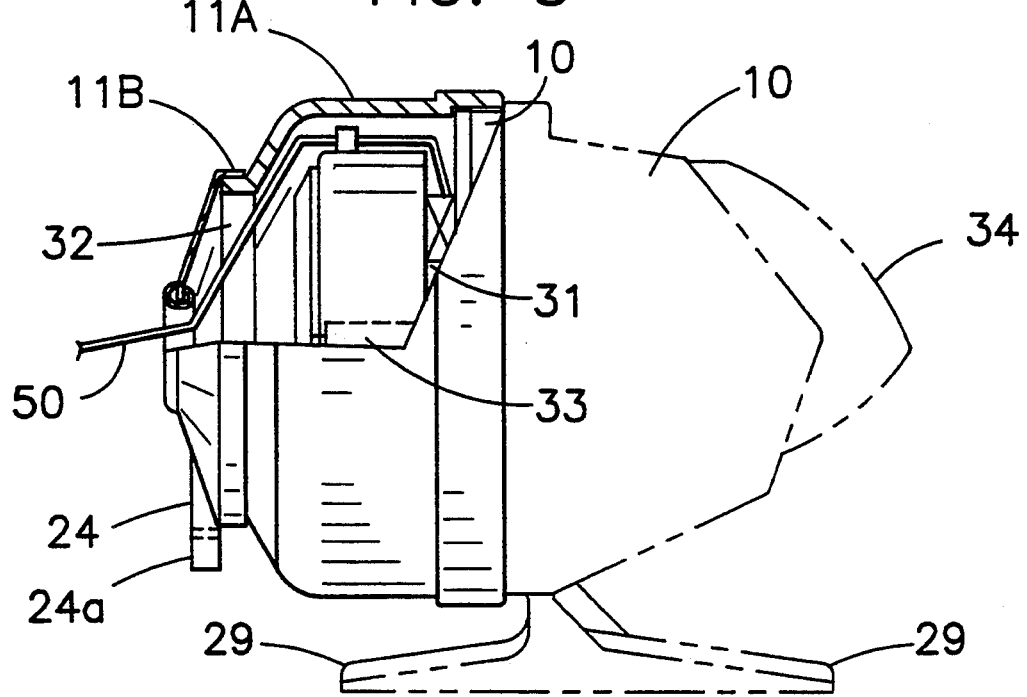
FIG. 5 is a partially cut-away side elevational view of the present invention depicting the profile of a typical spin-casting reel and the mounting of the first part (A) front-shield and second part (B) converting member thereupon in the second operational characteristic.

The illustration of FIG. 5 depicts the mated or joined relationship of the components of the convertible front-shield assembly first part (A) and second part (B) 11B and a reel mechanism assembly body 10 which is typical of that of most reel manufacturers; the most significant variance between manufacturers (as relates to the present invention) being the means of attachment of the front-shield member to the body 10 assembly as hereinabove addressed and described.

Figure 6:
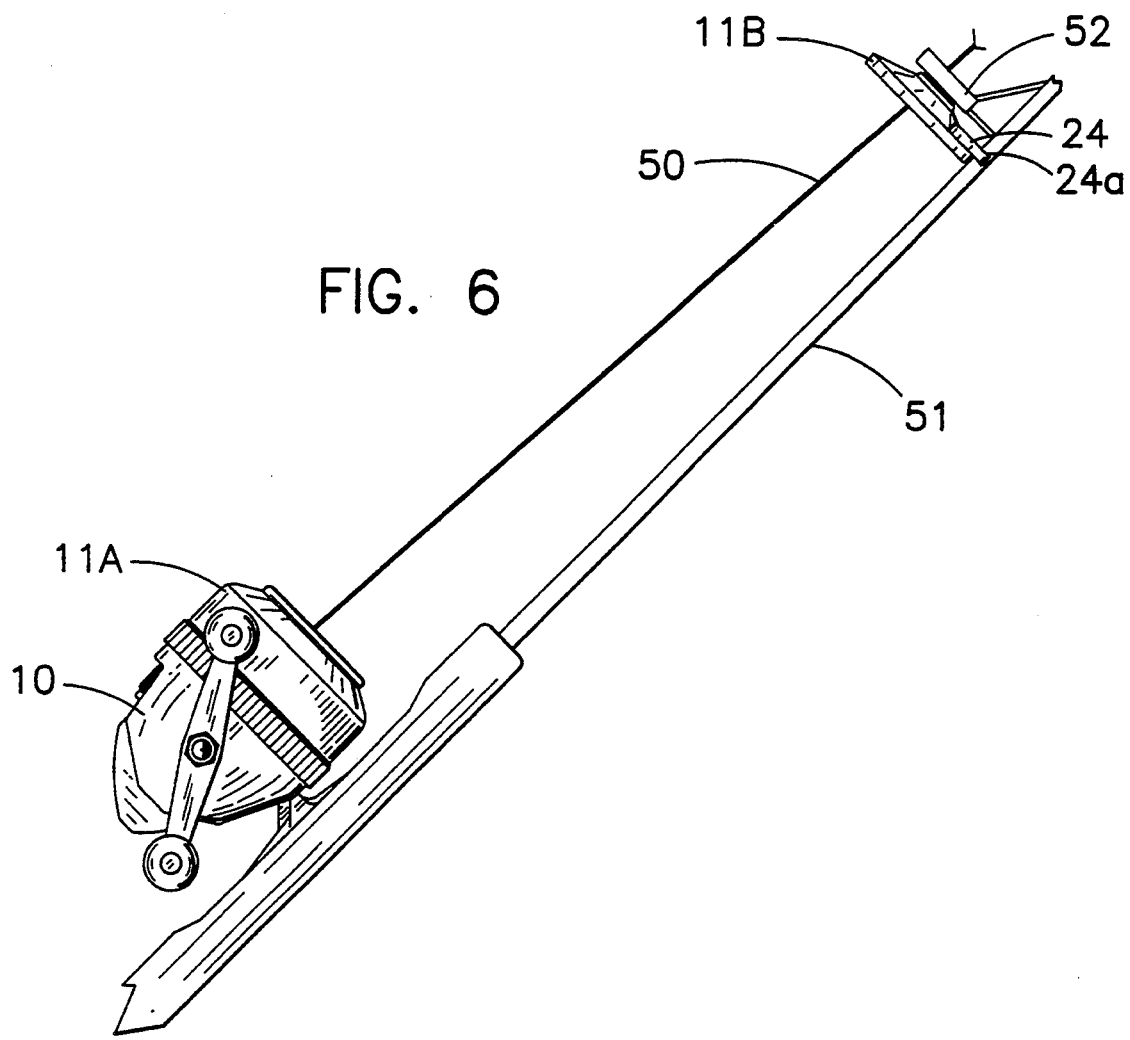
FIG. 6 is a partial side elevational view of a casting rod and reel assembly depicting the first part (A) front-shield in the first operational characteristic and illustrating the positioning of the second part (B) converting member in its stowed position upon the casting rod.
Figure 7:
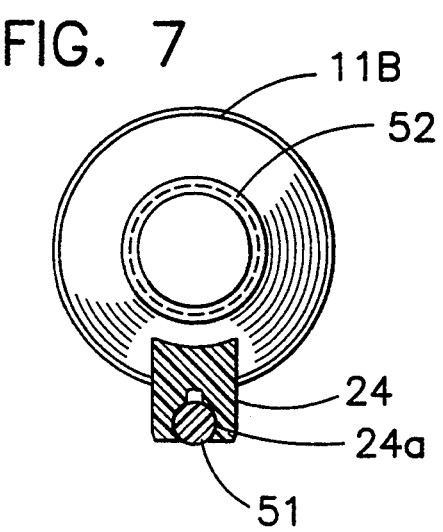
FIG. 7 is a front elevational view of the second part (B) converting member of the assembly depicted in the stowed position upon the casting rod.

The preferred embodiment of the present invention is further pictorially illustrated in FIG. 6 wherein a conventional spin-cast reel 10, mounted upon a conventional casting rod 51 (here shown in a partially shortened form) is equipped with the convertible first part (A) front-shield 11A configured in the first operational characteristic mode with the second part (B) converting element 11B detached therefrom and stowed by way of a conventional slotted and spreadable or expansive clip-like means 24A upon the casting rod shaft 51 proximate and is substantially concentric with the rearmost rod-mounted line guide member 52; as to impose no frictional impediment to the line 50 while remaining close-at-hand and continuing to encompass the casting line 50, it may be immediately and conveniently replaced upon the first part (A) front-shield member 11A. Returning the second Part (B) converting element 11B to removable attachment with the corresponding first part (A) front-shield 11A instantly configures and adapts the reel for a second operational characteristic, negating the requirement for cutting or parting of the casting line, or un-threading and re-threading said line through a plurality of rod-mounted line-guides, typically shown as 52. In FIG. 7 the second part (B) converting member 11B is shown to advantage in its stowed position upon the casting rod 51 with the central forward opening 25 being adjacent to and substantially concentric with the rearmost rod-mounted line-guide member 52.

It should be understood that the second part (B) converting element is not restricted to a single size of forward opening and that various other dimensions may be employed at the forward opening to further enhance the capability of each reel.

As the present invention is of an accessorial nature and is adjunctive to reels of various manufacturers, it is specifically noted that the use of the invention in no way influences, alters or effects either the line "snubbing" characteristics or the winding mechanism of the reel or the rod and reel combination upon which it is employed, but serves only to offer a conveniently selectable means of control of the friction imposed upon the out-flowing cast line to thereby enhance the casting characteristics, versatility and lure placement accuracy achievable with any given reel or rod and reel combination upon which it is employed. No other purpose is herein expressed, implied or intended.

It is felt that the present invention, herein disclosed, represents a forward step in the art and technology of spin-cast fishing reel design; is not revealed or anticipated, either by the prior art, usage, custom, tradition or previous commercialization.

While there has hereinabove been disclosed, described and depicted the currently preferred embodiment of the present invention, it should be understood that such was done for purposes of explanation and elucidation only and that certain changes, modifications, additions, deletions and improvements may be made thereto, within the scope of the claims hereinunder appended.

What I claim is:

1. A spin-cast fishing reel comprising:
    a body member having means for attachment to a fishing rod, a closed rearward end, and a forward end;
    a spool, having a forward end and a rearward end, supported on the forward end of said body member, said spool receiving fishing line which is wound thereon or cast therefrom;
    a wind/release rotor for the selective winding on or casting-off of fishing line, and means for rotating the rotor for said winding on of fishing line;
    wherein the improvement comprises a convertible front-shield assembly mounted on the forward end of the body member surrounding the spool, the convertible front-shield assembly comprising:
    a first part having a hollow, cylindrical section having a rear opening which is shaped to conform to the shape of the forward end of the body member and comprises means for mounting the convertible front-shield assembly on the body member, and a hollow, truncated conical section which defines a large diameter first forward opening;
    and a second part which comprises a circular member having at its outer periphery means for releasably mounting the second part over the first forward opening of the first part, and at its center a second forward opening of substantially smaller diameter than the first forward opening, said second part further comprising means for attachment to a fishing rod at a position spaced from said spin-cast reel;
    whereby the convertible front-shield assembly selectively alters the casting characteristics of the spin-cast reel by allowing casting through the large diameter first forward opening and the smaller diameter forward opening, with the second part alternatively attached to the fishing rod or mounted on the first part.

2. A spin-cast fishing reel as described in claim 1, having means for axially advancing said wind/release rotor, and wherein said wind/release rotor provides line snubbing action against said first part.

3. A spin-cast fishing reel as described in claim 1, wherein when said second part is attached to the fishing rod spaced from said reel, said first forward opening of said first part is concentric with said spool and said wind/release rotor for the selective winding on or cast-off of fishing line.

4. A spin-cast fishing reel as described in claim 1, wherein when said second part is releasably mounted to said first part, said second forward opening of said second part is concentric with said spool and said wind/release rotor for the selective winding on or casting-off of fishing line.

* * * * *